(12) United States Patent
Almagrabi et al.

(10) Patent No.: US 11,337,257 B1
(45) Date of Patent: May 17, 2022

(54) RANDOM-ACCESS CHANNEL IN 5G NETWORKS

(71) Applicant: King Abdulaziz University, Jeddah (SA)

(72) Inventors: Alaa Almagrabi, Jeddah (SA); Rashid Ali, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/560,504

(22) Filed: Dec. 23, 2021

(51) Int. Cl.
*H04W 4/00* (2018.01)
*H04W 74/08* (2009.01)

(52) U.S. Cl.
CPC .............................. *H04W 74/0833* (2013.01)

(58) Field of Classification Search
CPC .. H04W 74/0833; H04W 76/00; H04W 74/00
See application file for complete search history.

(56) References Cited

U.S. PATENT DOCUMENTS 9,832,794 B2 * 11/2017 Martin ............... H04W 28/0205
2017/0374683 A1 * 12/2017 Tavares ................. H04W 28/02

* cited by examiner

*Primary Examiner* — Siren Wei
(74) *Attorney, Agent, or Firm* — WC&F IP (57) ABSTRACT

Methods and systems for random-access channel in 5G networks is described. In one aspect, a method for a contention based-random access (CB-RA) through a random access channel (RACH) is disclosed. A base station may configure a set of RA preambles for CB-RA in a configuration information. The base station may distribute the set of RA preambles between a defined first boundary and a second boundary using a continuous exponential distribution (ED) in the configuration information. The base station distributes the RA preambles to occur continuously and independently with a constant parametric rate between the first boundary and the second boundary. The at least one User Equipment (UE) receives the configuration information. The at least one UE selects and communicates at least one RA preamble from the set of RA preambles. The base station may receive the selected at least one RA preamble from the at least one UE.

18 Claims, 7 Drawing Sheets

RANDOM-ACCESS CHANNEL IN 5G NETWORKS

TECHNICAL FIELD

The present disclosure relates to telecommunications and, more specifically, relates to the surface modified electrodes for random-access channel in 5G networks.

BACKGROUND

Figure 1:
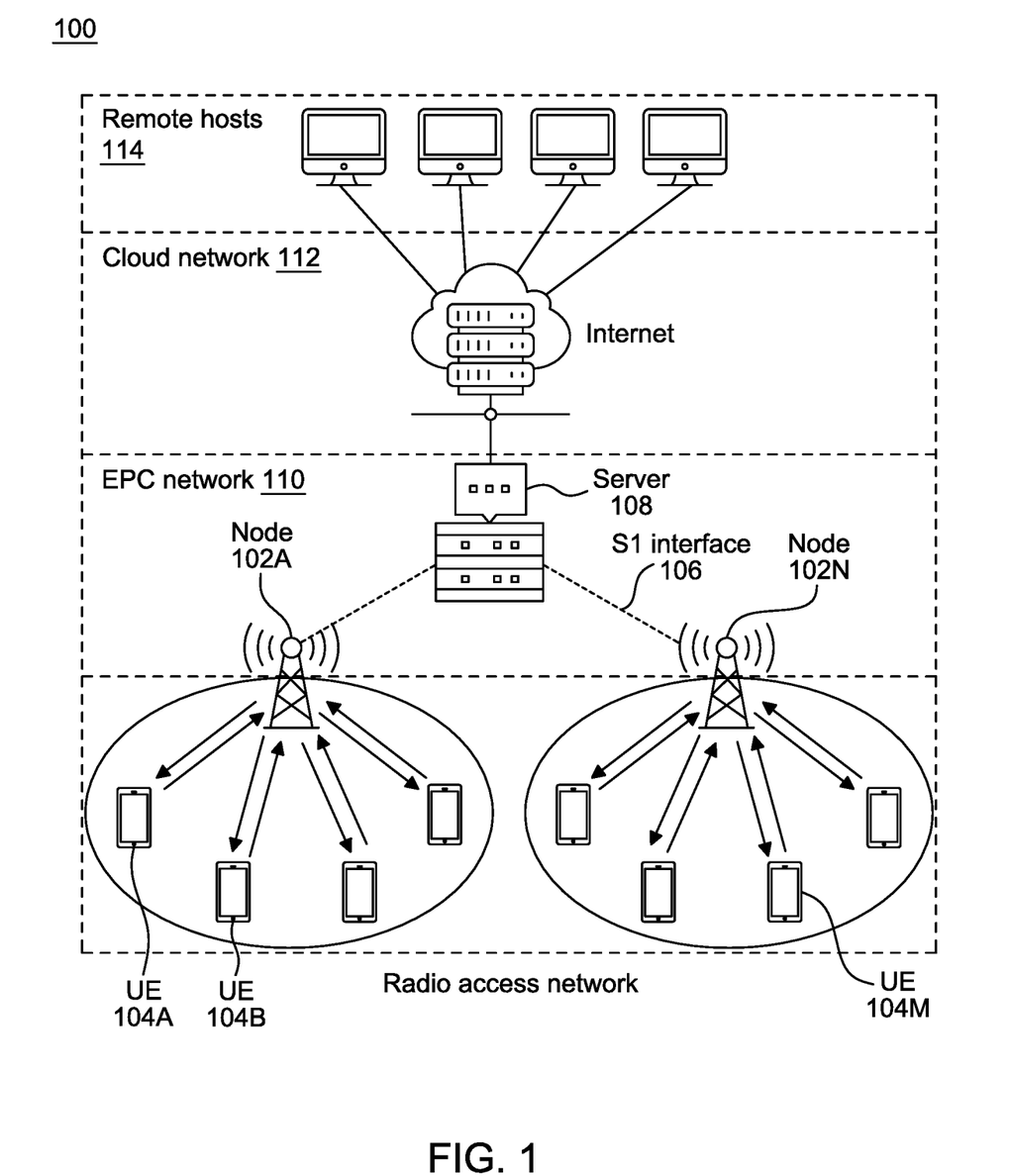
FIG. 1 is an high-level architecture of an exemplary 5G network with linked UEs' connectivity, according to one or more embodiments.

An significant increase in the demand for capacity in mobile communication devices has led wireless communication industries to prepare to support up to a multi-fold increase in total internet traffic. The 3rd Generation Partnership Project (3GPP) suggests that connecting the user equipment (UE) to an existing cellular network, such as Long-Term Evolution-Advanced (LTE-A), 5th generation (5G), and beyond 5G (B5G) networks, requires higher layer connections between the UEs. In general, a considerable amount of data may have to be distributed from many of UEs on a 5G network. In this way, the UEs may perform a Random Access (RA) mechanism for transmitting resource requests to the base station, known as evolved Node B (eNB). The UEs execute RA using the physical random-access channel (RACH) through a four-step handshake process. In many situations, several UEs attempt to communicate over the same channel resources in a dense UE deployment. As a result, the UEs contend to control the common radio resources creating a massive collision problem. Due to simultaneous UE channel access, preamble collisions can obstruct the RA process. A challenge of successful RA is crucial due to the increasingly growing number of connected UEs in the network. A standard 5G network, inter alia, includes two parts: the enhanced packet core (EPC) network and the radio access network (RAN). A high-level architecture 100 of an exemplary 5G network with linked UEs' connectivity is shown in FIG. 1, where UEs 104 are linked to the eNBs 102 (hereinafter alternatively referred to as Nodes). The EPC is responsible for the ultimate regulation of mobile devices and creating an Internet Protocol (IP) packet transmission path. The RAN is responsible for wireless networking and radio resource usage. The RAN, which provides the requisite protocols for the user and control plane to communicate with mobile devices (UEs) in 5G network, is composed of eNBs (e.g., nodes). The eNBs are interconnected through the X2 interface (not shown). In addition, the eNB is connected to server 108 in the EPC network 110 using an S1 interface 106. The server 108 may be communicatively coupled to remote hosts 114 through cloud network 112 via the internet. FIG. 1 is not explainer in detail as it is known in the art.

In a 5G network, a minimal resource scheduling unit for downlink (DL) and uplink (UL) transmission is referred to as a resource block (RB). An RB may consist of 12 subcarriers in the frequency domain (FD), each size of 180 kHz and one subframe in the time domain (TD), length of 1 ms. This time-frequency resource is called RACH, and it is the RB on which RA is performed. RA helps UEs initialize an association, known as a contention-based RA (CB-RA). In a CB-RA, UEs utilize preambles to launch the RA transmission attempt. There may be a total of 64 preambles divided into two categories: preambles of contention-free RA (CF-RA) and preambles of CB-RA. For CF-RA, the eNB incorporates a few preambles and designates specific preambles for various UEs. Residual preambles are used for CB-RA, where every UE randomly chooses one preamble from a set of predefined uniform random variables (RV). This uniform distribution (UD) of RVs is used to prevent the inevitable collisions in the 5G network when multiple UEs attempts to access the channel resources. However, in a UD-based channel access mechanism, every UE has an equal chance to choose an identical contention preamble close to the mean value of the UD, that is, $$\frac{a+b}{2}$$

for a lower bound a and an upper bound b, which may cause an increase in a collision among the UEs. It has been observed that with the continuous evolution of wireless communication technologies and the massive increase in connected devices, UD-based channel access mechanisms have already been proved less efficient. One of the reasons behind the still use of UD-based mechanisms is the backward compatibility and ease of use. However, due to channel scarcity and resource constraints, using the UD-based channel access mechanisms is no longer sufficient to reduce conflicts.

SUMMARY

In one aspect of the present disclosure, a method for a contention based-random access (CB-RA) through a random access channel (RACH) is disclosed. The method includes configuring, by a base station, a set of RA preambles for CB-RA in a configuration information, distributing, by the base station, the set of RA preambles between a defined first boundary and a second boundary using a continuous exponential distribution (ED) in the configuration information, wherein the base station distributes the RA preambles to occur continuously and independently with a constant parametric rate between the first boundary and the second boundary, receiving, by at least one User Equipment (UE), the configuration information through the RACH, selecting and communicating, by the at least one UE, at least one RA preamble from the set of RA preambles, receiving, by the base station, the selected at least one RA preamble communicated by the at least one UE, and providing, by the base station, a RA response (RAR) in response to the receiving the selected residual preamble from by the at least one UE.

In another aspect of the present disclosure, a system for a contention based-random access (CB-RA) through a random access channel (RACH) is disclosed. The system includes a base station and one or more User Equipments (UE), the base station is configured to configure a set of RA preambles for CB-RA in a configuration information, and distribute the set of RA preambles between a defined first boundary and a second boundary using a continuous exponential distribution (ED) in the configuration information, wherein the base station distributes the RA preambles to occur continuously and independently with a constant parametric rate between the first boundary and the second boundary. The one or more User Equipments (UEs) configured to be communicatively coupled with the base station are configured to receive the configuration information through the RACH, select and communicate at least one RA preamble from the set of RA preambles, wherein the base station is configured to receive the selected at least one RA preamble communicated by the at least one UE, and provide a RA response (RAR) responsive to the receiving the selected residual preamble from by the at least one UE.

In yet another aspect of the present disclosure, a base station in a communication network is disclosed. The base station includes at least one processor for managing a contention based-random access (CB-RA) through a random access channel (RACH). The at least one processor configured to configure a set of RA preambles for CB-RA in a configuration information and distribute the set of RA preambles between a defined first boundary and a second boundary using a continuous exponential distribution (ED) in the configuration information, wherein the base station distributes the RA preambles to occur continuously and independently with a constant parametric rate between the first boundary and the second boundary, communicate the configuration information comprising the set of RA preambles through the RACH, receive a selected at least one RA preamble from an at least one UE, and provide a RA Response (RAR) responsive to the receiving the selected residual preamble from by the at least one User Equipment (UE).

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

It should be appreciated by those skilled in the art that any diagram herein represents conceptual views of illustrative systems embodying the principles of the present disclosure.

DETAILED DESCRIPTION

Reference will now be made in detail to specific embodiments or features, examples of which are illustrated in the accompanying drawings. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps, and processes described herein are not to be construed as necessarily requiring their performance in the particular order discussed or illustrated, unless specifically identified as an order of performance. It is also to be understood that additional or alternative steps may be employed, unless otherwise indicated.

The use of the singular herein includes the plural (and vice versa) unless specifically stated otherwise. The use of the terms "include," "includes", "including," "have," "has," or "having," "comprise," "comprises," "comprising" or the like should be generally understood as open-ended and non-limiting unless specifically stated otherwise. It is understood that the order of steps or order for performing certain actions can be changed so long as the intended result is obtained. Moreover, two or more steps or actions may be conducted simultaneously. As used herein, the term "about" or "between" refers to a ±20% to ±10% variation from the nominal value unless otherwise indicated.

Embodiments of the present disclosure are directed to methods and systems for random-access channel in 5G networks. The disclosure, in one embodiment, uses a Poisson process-based RA framework is to spread the UEs in a parametric set of a probability distribution. The parametric distribution approach allows the system to disperse RVs exponentially. In one or more embodiments, the disclosure uses RVs with Poisson distribution, such as a continuous exponential distribution (ED). In some examples, the method may be referred to as Poisson process-based RACH (2PRACH). The systems and methods of the disclosure describes a 2PRACH mechanism, that replaces a UD with ED in random access mechanism for 5G/B5G networks.

An exemplary high-level architecture of an exemplary 5G network as illustrated in FIG. 1. FIG. 1 illustrates User Equipments (UEs) 104 communicatively coupled to corresponding nodes 102A-N in the Radio Access Network (RAN). The RAN is responsible for wireless networking and radio resource usage. The UE's 104 may include a mobile device, a tablet, and such devices. The node 102A-N may be base stations. The nodes 102A-N are communicatively coupled to the server 108 in the EPC network 110. The EPC network 110 is responsible for the ultimate regulation of mobile devices and creating an Internet Protocol (IP) packet transmission path. The server 108 may be communicatively coupled to remote hosts 114 through cloud network 112 via the internet.

When a UE 104A is switched on or awakened from an airplane mode, the UE 104A may try to perform time and frequency synchronization with the node 102A. To obtain perform time and frequency synchronization with the node 102A, the UE 102A may detect synchronization signals to find out where a frame begins and ends. The two type of synchronization signals include a primary synchronization signal (PSS) and a secondary synchronization signal (SSS). The PSS signal includes of one of three 62-symbol Zadoff-chu sequences in a cell. In some implementations, the PSS is broadcast twice during every radio frame and both transmissions are identical. The SSS are one of 168 codes which are 62-bit sequences. The SSS may be broadcast twice in every radio frame. The UE 102A may first acquire the PSS followed by the SSS. Unlike the PSS, the SSS supports the UE 102A to achieve radio frame synchronization and deduce a pointer towards 1 of 168 Physical layer Cell Identity (PCI) groups. Using the PSS and the SSS, the UE 104A may initially synchronize with the DL channels by the PSS and the SSS from the node 102A. The UE 104A separates the Master Information Block (MIB) that includes contains data on the DL and UL carriers' configuration so that the node 102A receives data from the Sender Information Block (SIB). The MIB is the broadcast information transmitted by the node 102A periodically. The MIB may include information on logical channel—BCCH (Broadcast Common Control Channel), transport channel—BCH (Broadcast Channel), physical channel—PBCH (Physical Broadcast channel), RLC Mode—(Transparent Mode). The size of the MIB may be 24 Bits. In some embodiments, the MIB may require 6 RBs (72 subcarriers) in Frequency domain. All RA parameters are included in the SIB, such as the number of available RA slots, RA preamble classes, and preamble setup. The UE 104A may generate contention-based RA (CB-RA) transmission attempts to decode the SIB. For association initialization in a 5G network, the CB-RA conducts four main phases as illustrated in FIG. 2.

Figure 2:
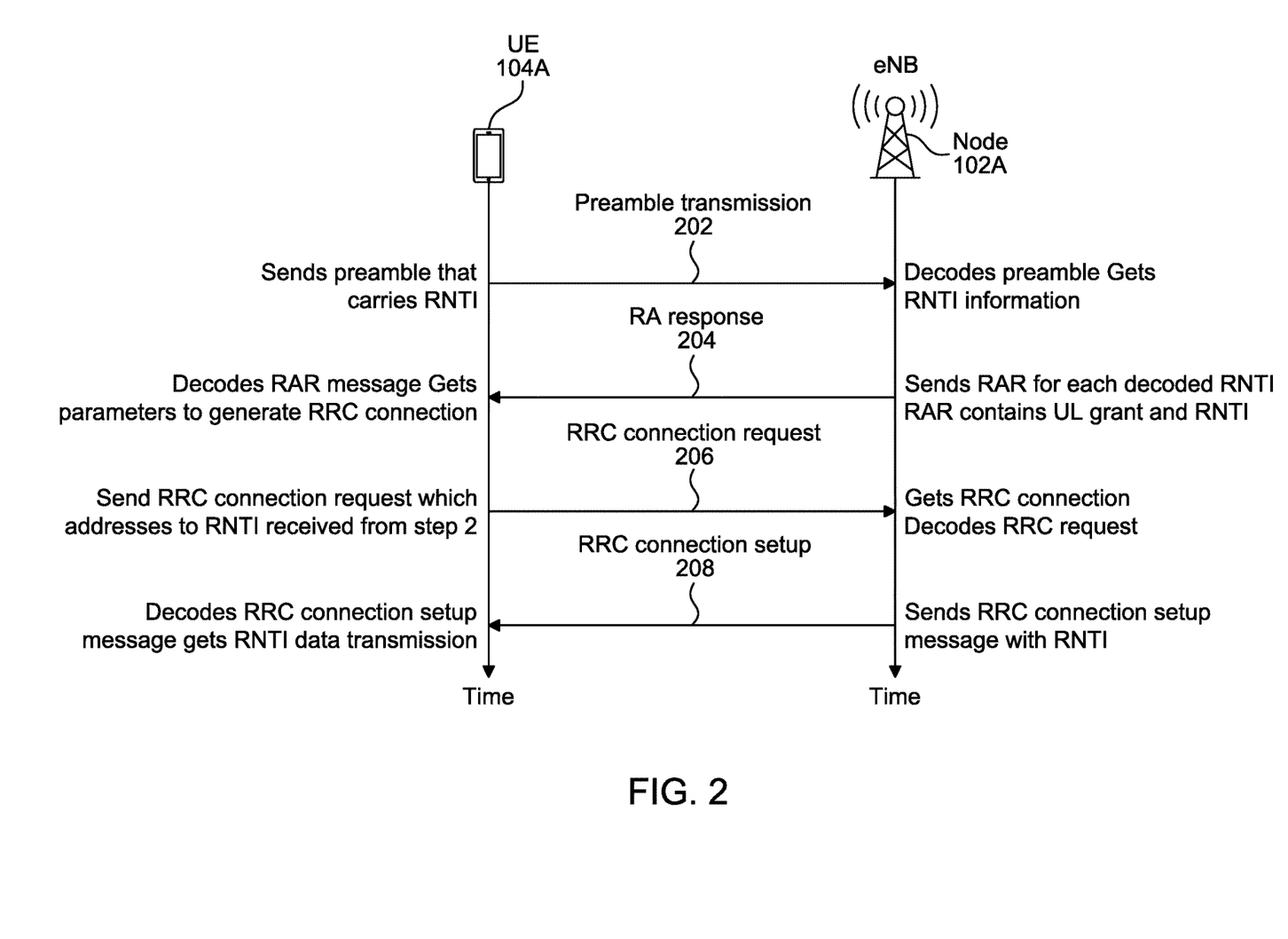
FIG. 2 illustrates a Contention-Based Random Access (CB-RA) procedure in a 5G network, according to one or more embodiments.

FIG. 2 illustrates a Contention-Based Random Access (CB-RA) procedure in a 5G network, according to one or more embodiments.

Step 202 describes a preamble transmission of the UE 104A to the node 102A. By choosing a randomly generated one of the accessible CB preambles from a uniform distribution, the UE 104A may initiate the CB-RA and communicates the CB-RA to the node 104A at the next available RACH slot. The eNB regularly broadcasts SIB messages that encourage the UEs to select a good preamble from them. The physical properties of RA preamble in a PRACH may include the RA radio network temporary identification (RNTI) and the preamble data configuration. The UE 104A may wait for an RA response (RAR) window once the preamble is submitted.

Step 204 describes a Random Access Response (RAR) from the node 102A to the UE 104A. The node 102A may calculate a Power Delay Profile (PDP) of the obtained preamble on the PRACH. A predefined threshold is tested for the calculated PDP, and, if the calculated PDP is found to be greater than the threshold, the calculated PDP is referred to as an active RA preamble. The node 102A may decode the RNTI for each active RA preamble to discover the RA slot where the preamble has been submitted. Subsequently, the node 102A may send a RAR message to the decoded UEs 104A on the DL control message channel. The RAR message may include a timing advance (TA) instruction to synchronize eventual UL transmissions, a UL resource award for radio resource channel (RRC) requirements, and a short RNTI, which could be made stable at the collision resolution period (CRP). However, if different UEs 104B-M transmit a similar preamble at a similar RA slot, a collision occurs.

Step 206 describes a RRC Connection Request from the UE 104A to the node 102A. The channel services are delegated to the UE 104A as specified in the step 204. Thus, the UE 102A sends an RRC link request and a scheduling request to the node 104A. In step 206, a message is forwarded to the temporary RNTI assigned in the step 204 of the RAR message and conveys either a particular RNTI if the node 102A already has one RRC-associated UE 102A, or an initial UE identity, or a randomly chosen number. However, colliding UEs seek to retransmit RA channel requests using the same UL procedure due to a collision in phase 2. Consequently, further collisions may occur in the network.

Step 208 describes a RRC Connection Setup from the node 104A to the UE 102A. This phase is also known as CRP, in which the node 104A acknowledges the UE 102A after decoding the RRC request. RRC link configuration messages are sent using the dedicated RNTI. After this, an acknowledgment is submitted by the active UEs 104A-M to the node 102A and proceeded with data transmission. However, once the limit of retransmission attempts is approached, the colliding UEs 102A-M must wait to begin a new CB-RA process. To prevent such collisions, the disclosure describes using a Poisson process-based distribution, which expresses the probability of a given RV of events independently and distributive occurring in a fixed interval of time or space with a known constant rate. In the Poisson process-based method, an ED distributes random values between two boundaries. Random variables exist constantly and independently with a constant average rate of $$\frac{1}{\hat{\lambda}},$$

for the $\hat{\lambda}$ as a constant rate parameter. This is explained in detail below.

As described, a very few numbers of preambles for CB-RA are used in each RA slot. The use of uniformly distributed random variable-based RA for preamble collection has a restriction on assembling contending UEs close to an estimated mean value of $$\mu = \frac{a+b}{2},$$

resulting in higher collisions after a long run or concurrently accessing multiple UEs. Therefore, the disclosure uses a Poisson process-based RACH (2PRACH) instead of UD-based RACH. A continues exponential distribution is one of the probability distributions which deals with the time events in a Poisson process. The probability density function (PDF), $\psi(.)$, of such an exponential distribution with a random variable x (preamble in a RACH) and constant parameter $\lambda$ can be defined as, $$\psi(x; \hat{\lambda}) = \begin{cases} \lambda e^{-\lambda x}, \forall x \geq 0 \\ 0, \forall x \geq 0 \end{cases} \quad (1)$$

In this equation, $\lambda > 0$ is the constant rate parameter of a Poisson process-based exponential distribution. A Poisson process-based exponentially distributed random variable X with a constant rate parameter $\hat{\lambda}$ allows UEs to stay with the boundaries of mean given by:

$$E[X] = \frac{1}{\lambda} \quad (2)$$

which is evident to make sense that, if a UE tries to access the channel at an average rate of $\kappa=2$ per data frame transmission, then the UE expects to wait $$E[X] = \frac{1}{2} = 0.5$$

for every next transmission attempt. In addition, the variance of such a UE with random variable X to access the channel resources is given by:

$$\text{var}[X] = \frac{1}{\lambda^2}. \quad (3)$$

Hence, the standard deviation of the UE remains same as of its mean value. In 2PRACH mechanism, every UE follow the memory-lessness property of the ED. Thus, the time spent by the UE waiting to access the channel relative to its previous or initial time is conditioned on its failure to access the resources at timeslot, while the remaining channel access time is distributed same as the original unconditional distribution.

Figure 3:
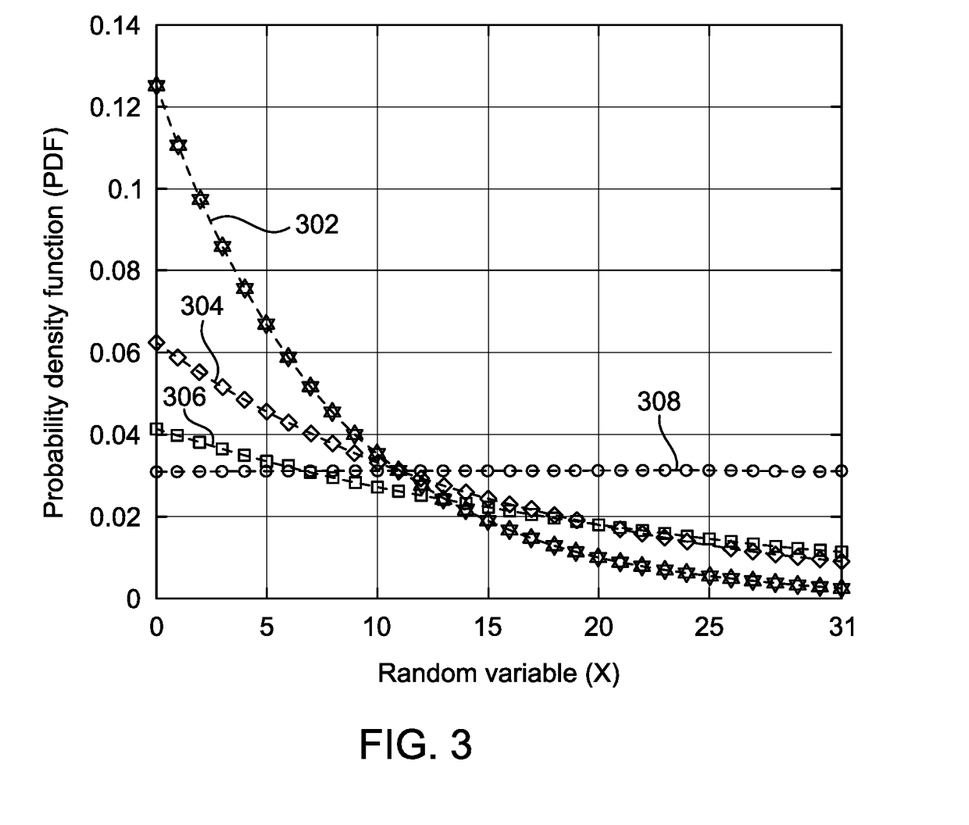
FIG. 3 illustrates a comparison of uniform distribution-based and Poisson process-based random value dispersion, according to one or more embodiments.

The 2PRACH approach decreases the collision incidence and improves the performance rate of the existing RA of the UE association without altering the 3GPP recommended RA procedure. A result of which is illustrated in FIG. 3. FIG. 3 shows a random variable (X) between a uniform random value and a Poisson process-based random value (that is an ED). FIG. 3 illustrates a Poisson process-based random value with $\kappa=8$ shown as 302, $\kappa=16$, shown as 304, $\kappa=24$ shown as 306. The random variable (X) for a uniform random value is shown as 308.

Simulations were performed in a discrete-event network simulator release 3.30.1 (ns-3.30.1) to evaluate the performance of the 2PRACH approach. The network topology used in simulations includes a radio access network part of a typical UE communication, as shown in FIG. 1. The 2PRACH approach efficiency is measured in terms of network stability (reliability) and end-to-end latency. These two evaluation parameters are tested for three different scenarios. First, simulations were conducted with increasing number of UEs in the network, that is N={2,4,8,16,32,64}. Thereafter, the efficiency was assessed with varying data packet sizes and interarrival packet speeds. The objective of conducting simulations of various packet sizes and rates of interarrival is to evaluate the impact on the 2PRACH approach real data transmissions. From FIG. 3, it is observed that the users' distribution tends towards the similar density function as of a uniform distribution. Therefore, one can choose the average rate parameter ($\lambda$) according to the conditions and requirements. In the simulation, $\lambda=8$ was used as rate parameter, which distributes the users near the initial channel access slots. Detailed simulation parameters and their used values are described in Table 1.

TABLE 1

Simulation parameters and their values

| Parameter | Value(s) |
|---|---|
| Simulation time | 100 s |
| Simulation model | LTE-EPC model |
| Number of eNBs | 2 |
| Number of UEs | 2, 4, 8, 16, 32, 64 |
| Distance between UE and eNB | 60 m |
| Data payload (packet) sizes | 32, 64, 128, 256, 512, 1024 Bytes |
| Packet Interarrival rates | 5, 10, 20, 40, 80, 160, 1000 ms |
| Total number of RA preambles | 64 |
| CB-RA preambles | 52 |
| Rate parameter ($\lambda$) | 8 |

Figure 4A:
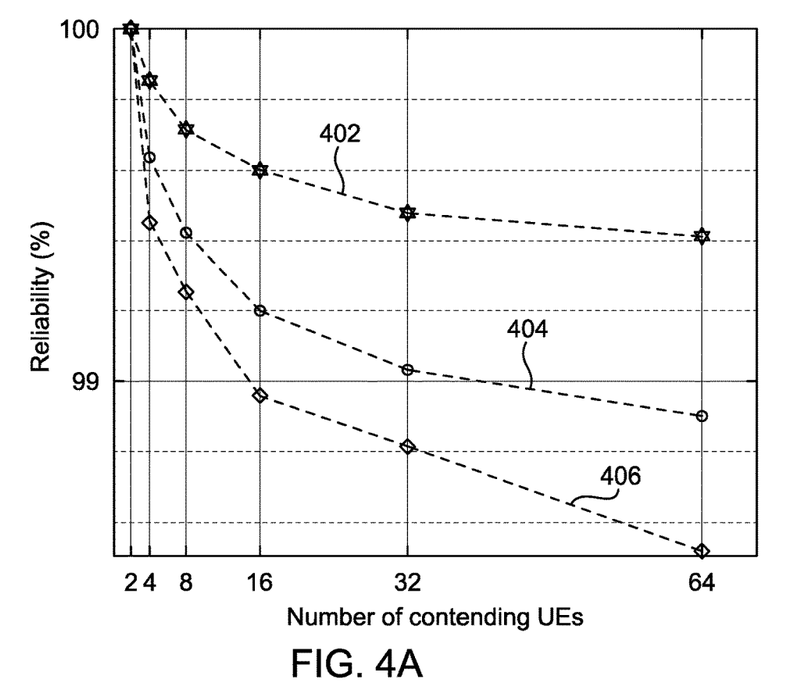
FIG. 4A illustrates a performance comparison of process-based random-access channel (2PRACH) with existing random access channel (RACH) and contention-resolution-based RACH (CRB-RACH) in terms of reliability, according to one or more embodiments.
Figure 4B:
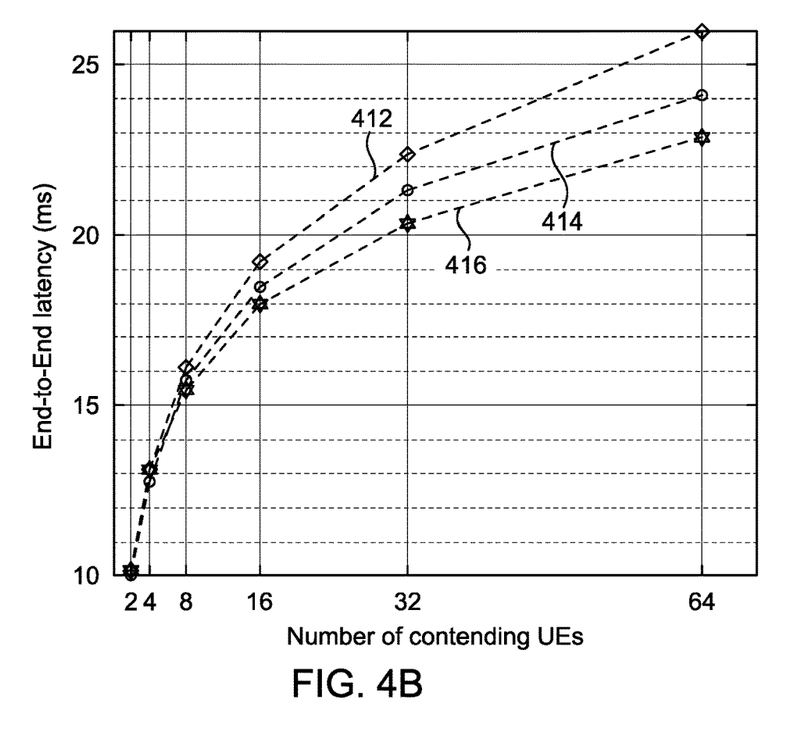
FIG. 4B illustrates a performance comparison of the 2PRACH with the existing RACH and the CRB-RACH in terms of end-to-end latency, according to one or more embodiments.

FIG. 4A illustrates a performance comparison of the 2PRACH with the existing RACH and contention-resolution-based RACH (CRB-RACH) in terms of reliability, according to one or more embodiments. FIG. 4A compares the efficiency of the 2PRACH mechanism (shown by 402) with the existing UD-based RACH procedure (shown by 406), and the CRB-RACH mechanism (shown by 408), with varying number of contending UEs. FIG. 4A illustrates that the 2PRACH mechanism as shown by 402, achieves higher reliability than existing UD-based RACH and CRB-RACH procedures, also in dense UEs deployments, which is 64 UEs. Similarly, the networks end-to-end latency is also reduced for the 2PRACH mechanism, as shown in FIG. 4B. As illustrated in FIG. 4B, a reading 416 corresponding to the 2PRACH mechanism shows lowest end-to-end latency as compared to existing UD-based RACH procedure (shown by 412) and CRB-RACH procedure (shown by 414)

In the 2PRACH scheme, improved reliability and reduced latency are evident that for a denser UE environment, choosing earlier RA preambles with a constant parametric rate decreases collision among the UEs. The improved efficiency is because a Poisson process-based distribution manages the number of events in a fixed time frame and the time between occurrences of those successive events. The Poisson process-based distribution fits the RACH scheme's settings because the Poisson process-based distribution is one of the distributions with the "lack-of-memory" property. In other words, after waiting to access the channel without successful transmission, the probability of a UE to access the channel in the next contention is the same as was the probability (in previous transmission attempt) of accessing the channel in the following two transmission attempts. Thus, as a UE in the system continues to wait, the chance of successful transmission neither increases nor decreases based on the parameter selected. Although the CRB-RACH procedure improves the efficiency compared to the existing RACH with the use of dynamic backoff adjustment, due to the use of uniformly distributed backoff parameters, it achieves lesser reliability and higher latency as compared to 2PRACH. The efficiency of the 2PRACH mechanism is also measured with various data packet sizes. The motivation to evaluate an RA process with different data frame sizes is that the UEs' channel capital occupancy time very much depends upon the data frame size to transmit.

Figure 5A:
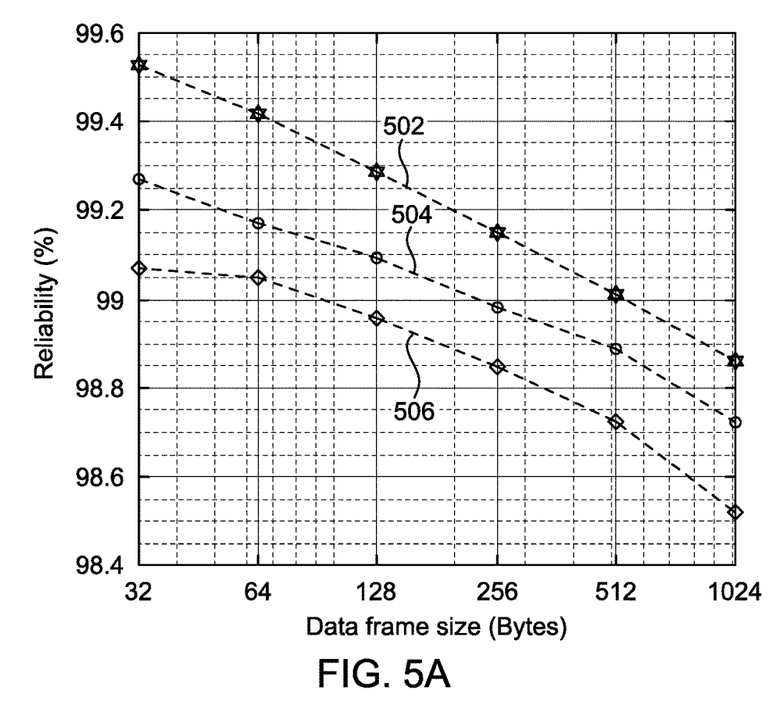
FIG. 5A illustrates a performance comparison of the 2PRACH with existing RACH and CRB-RACH procedures with varying data frame sizes in terms of network reliability, according to one or more embodiments.
Figure 5B:
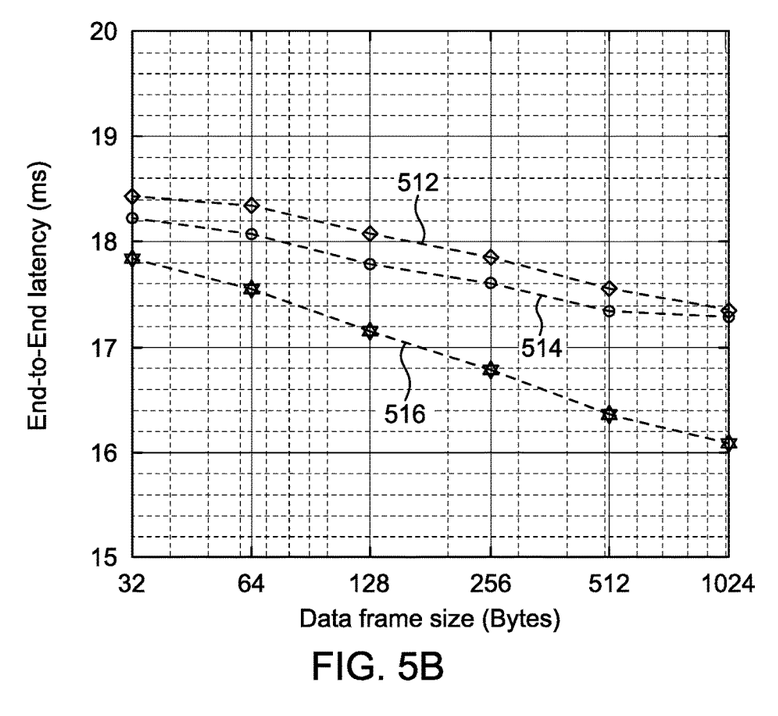
FIG. 5B illustrates a performance comparison of the 2PRACH with existing RACH and CRB-RACH procedures with varying data frame sizes in terms of end-to-end latency, according to one or more embodiments.
Figure 6A:
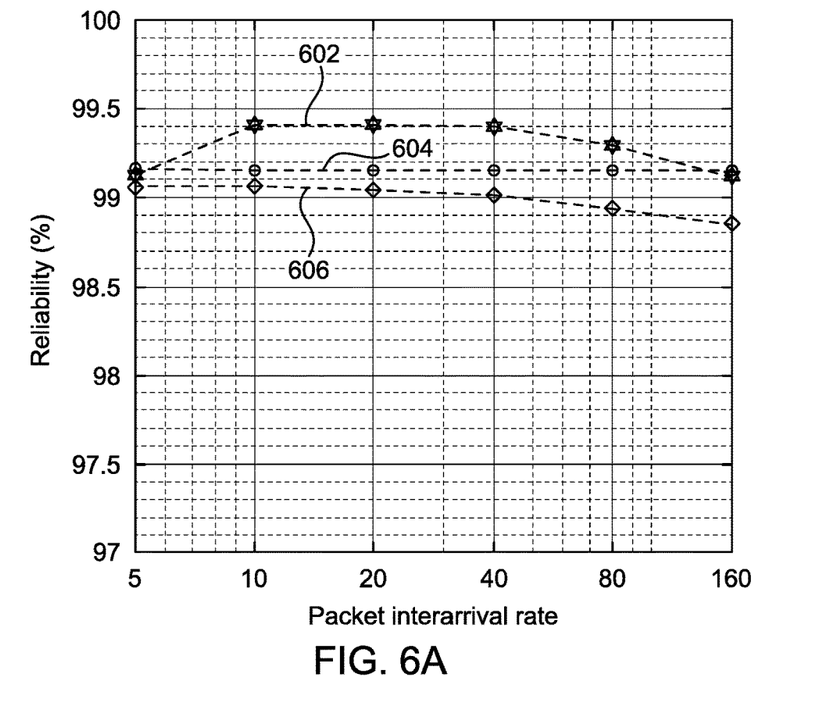
FIG. 6A illustrates a performance comparison of the 2PRACH with existing RACH and CRB-RACH procedures with varying packet interarrival rate in terms of network reliability, according to one or more embodiments.
Figure 6B:
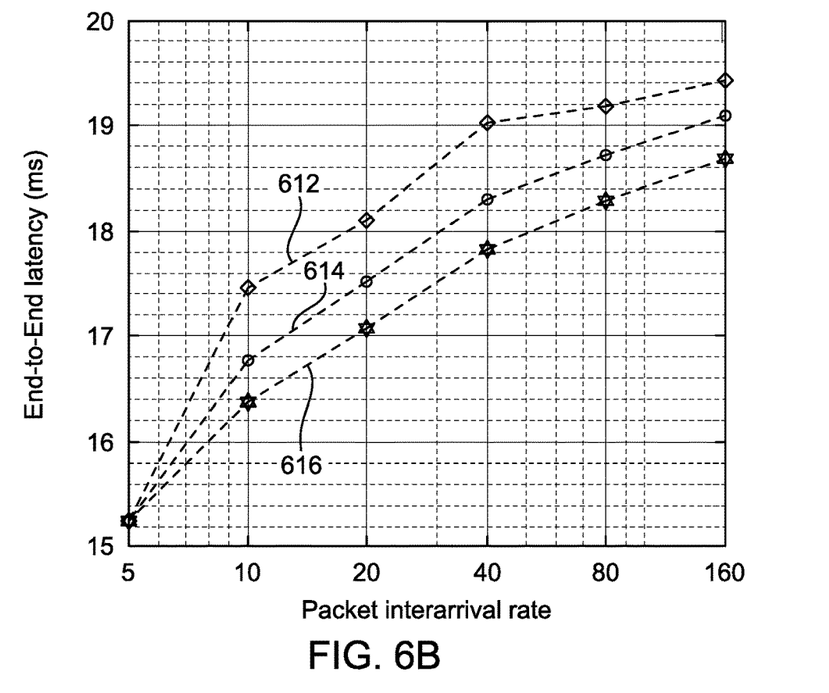
FIG. 6B illustrates a performance comparison of the 2PRACH with existing RACH and CRB-RACH procedures with varying packet interarrival rate in terms of network end-to-end latency, according to one or more embodiments.

FIG. 5A illustrate a performance comparison of the 2PRACH with existing RACH and CRB-RACH procedures with varying data frame sizes in terms of network reliability, according to one or more embodiments. FIG. 5A illustrates an effect on the networks stability and latency of various data frame sizes. FIG. 5A demonstrates that the 2PRACH procedure works well for the reliability aspect. FIG. 5A illustrates that the 2PRACH mechanism as shown by 502, achieves higher reliability than existing UD-based RACH (shown by 506) and CRB-RACH procedures (shown by 504). FIG. 5B illustrate a performance comparison of the 2PRACH with existing RACH and the CRB-RACH procedures with varying data frame sizes in terms of end-to-end latency, according to one or more embodiments. FIG. 5B shows the effect on the networks stability and latency of various data frame sizes. The figures reveal that the 2PRACH procedure works well the end-to-end latency relative to the existing UD-based RACH when considering the different types of data frame sizes. As illustrated in FIG. 5B, a reading 516 corresponding to the 2PRACH mechanism shows lowest end-to-end latency as compared to existing UD-based RACH procedure (shown by 512) and CRB-RACH procedure (shown by 514). However, an influence of data frame interarrival rate has fewer effects on the network's stability and latency efficiency, as seen in FIG. 6A and FIG. 6B, respectively. FIG. 6A illustrates 2PRACH mechanism performing reliably well (shown by 602) in comparison with existing the existing UD-based RACH (shown by 606) and CRB-RACH procedures (shown by 604). FIG. 6B illustrates 2PRACH mechanism showing low end-to-end latency (shown by 616) in comparison with existing the existing UD-based RACH (shown by 612) and CRB-RACH procedures (shown by 614).

The importance of using a Poisson process-based distribution is evident from the figures (that is, FIG. 4-FIG. 6). The main purpose of the 2PRACH for the RA procedure is to enable the UEs in the network to carry out their initialization of the association more effectively, where reliability is accomplished by reducing network collisions.

Figure 7:
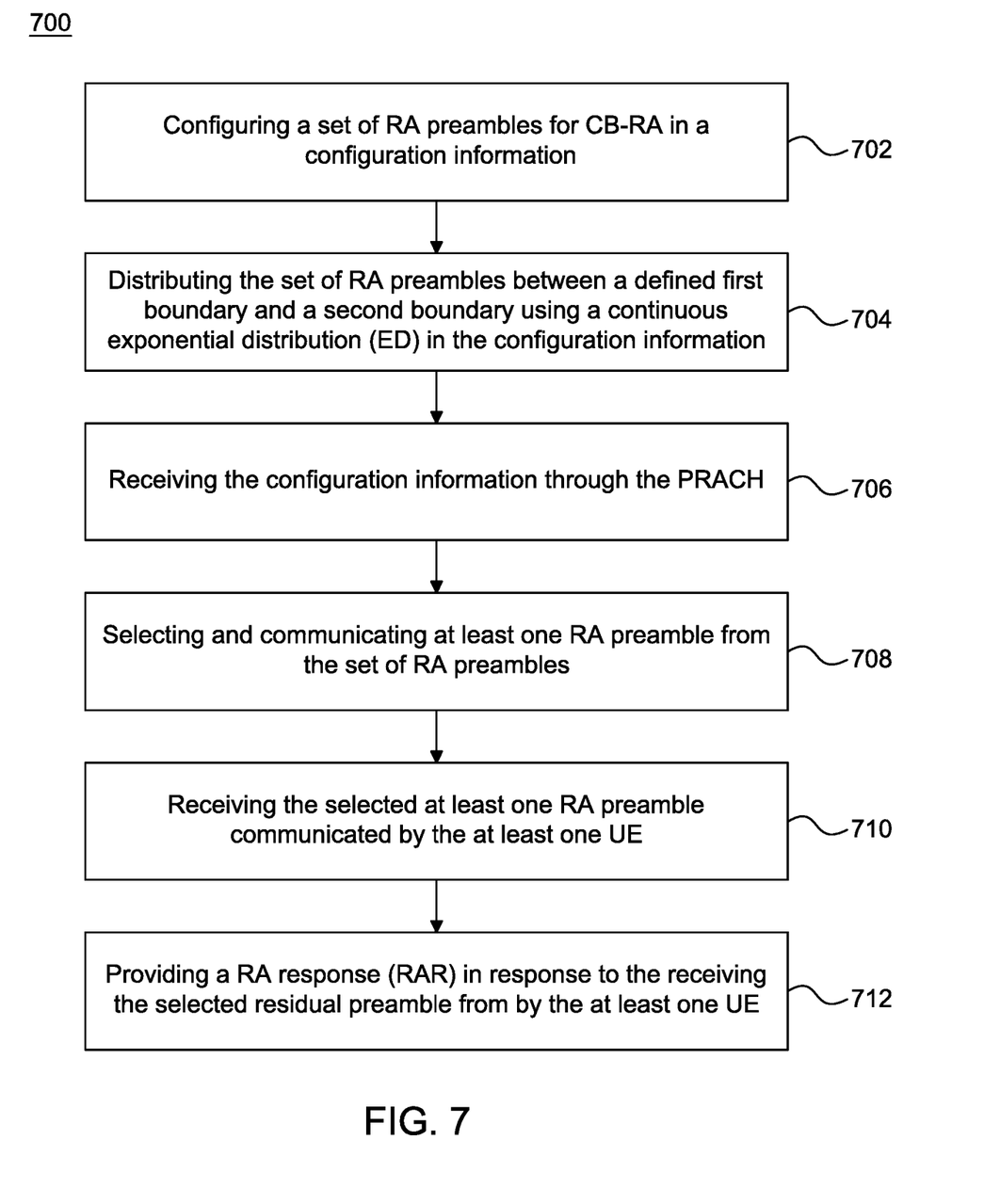
FIG. 7 illustrates a process for a contention based-random access (CB-RA) through RACH, according to one or more embodiments.

FIG. 7 illustrates a process for a contention based-random access (CB-RA) through RACH, according to one or more embodiments. In step 702, a base station may configure a set of RA preambles for CB-RA in a configuration information. In step 704, the base station may distribute the set of RA preambles between a defined first boundary and a second boundary using a continuous ED in the configuration information. In some examples, the continuous ED in the configuration information is a Poisson process-based distribution. In some examples, the remaining channel access time is distributed same as the original unconditional distribution. The base station distributes the RA preambles to occur continuously and independently with a constant parametric rate between the first boundary and the second boundary. In some examples, the base station distributes the RA preambles constantly and independently with a constant average rate of $$\frac{1}{\bar{\Lambda}},$$

for a $\bar{\Lambda}$ as a constant rate parameter. In step 706, the UE may receive the configuration information through the RACH. In step 708, the at least one UE may select and communicate at least one RA preamble from the set of RA preambles. In some examples, the at least one UE selects at least one RA parameter in the configuration information from the SIB. In step 710, the selected at least one RA preamble communicated by the at least one UE may be received by the base station. In step 712, the base station may provide the RAR in response to the receiving the selected residual preamble from by the at least one UE.

As described above, neither of the known art describe replacing the traditional UD-based channel access procedure due to its ease of use and backward compatibility. Therefore, the limitations and challenges posed by the uniform distribution are always ignored. The 2PRACH approach as described in the disclosure expands the current RACH capabilities by implying parametric channel access, which is a more dynamic and robust technique. It 2PRACH approach enables new ways for researchers and industrialists to think beyond the conventional RACH mechanism and overcome the channel scarcity challenges. As shown in the results, the achieved higher reliability, and the reduced latency proves that the shift of the RACH mechanism from a uniform distribution to a Poisson process-based mechanism has potentials for the next-generation 5G and beyond networks.

It is understood that the examples, embodiments and teachings presented in this application are described merely for illustrative purposes. Any variations or modifications thereof are to be included within the scope of the present application as discussed.

ACKNOWLEDGMENT

The authors extend their appreciation to the Deputyship for Research & Innovation, Ministry of Education in Saudi Arabia for funding this research work through the project number "2021-094" and King Abdulaziz University, DSR, Jeddah, Saudi Arabia

The invention claimed is:

1. A method for a contention based-random access (CB-RA) through a random access channel (RACH) comprising:
   configuring, by a base station, a set of RA preambles for CB-RA in a configuration information;
   distributing, by the base station, the set of RA preambles between a defined first boundary and a second boundary using a continuous exponential distribution (ED) in the configuration information, wherein the base station distributes the RA preambles to occur continuously and independently with a constant parametric rate between the first boundary and the second boundary;
   receiving, by at least one User Equipment (UE), the configuration information through the RACH;
   selecting and communicating, by the at least one UE, at least one RA preamble from the set of RA preambles;
   receiving, by the base station, the selected at least one RA preamble communicated by the at least one UE; and
   providing, by the base station, a RA response (RAR) in response to receiving the selected at least one RA preamble from by the at least one UE.

2. The method of claim 1, wherein the base station distributes the RA preambles constantly and independently with a constant average rate of $$\frac{1}{\bar{\Lambda}},$$

for a $\bar{\Lambda}$ as a constant rate parameter.

3. The method of claim 1, wherein the continuous ED is a Poisson process-based distribution.

4. The method of claim 1, wherein a time spent by the at least one UE waiting to access a channel relative to its previous or initial time is conditioned on the at least one UE failure to access resources at a timeslot.

5. The method of claim 1, wherein the remaining channel access time is distributed same as the original unconditional distribution.

6. The method of claim 1, wherein the at least one UE selects the at least one RA parameter in the configuration information from a Sender Information Block (SIB).

7. A system for a contention based-random access (CB-RA) through a random access channel (RACH) comprising:
a base station to:
configure a set of RA preambles for CB-RA in a configuration information; and
distribute the set of RA preambles between a defined first boundary and a second boundary using a continuous exponential distribution (ED) in the configuration information, wherein the base station distributes the RA preambles to occur continuously and independently with a constant parametric rate between the first boundary and the second boundary;
at least one User Equipment (UE) configured to be communicatively coupled with the base station, the at least one UE configured to:
receive the configuration information through the RACH;
select and communicate at least one RA preamble from the set of RA preambles, wherein the base station is configured to receive the selected at least one RA preamble communicated by the at least one UE, and provide a RA response (RAR) responsive to receiving the selected at least one RA preamble from the at least one UE.

8. The system of claim 7, wherein the base station distributes the RA preambles constantly and independently with a constant average rate of $$\frac{1}{\bar{\lambda}},$$

for a $\bar{\lambda}$ as a constant rate parameter.

9. The system of claim 7, wherein the continuous ED is a Poisson process-based distribution.

10. The system of claim 7, wherein a time spent by the at least one UE waiting to access a channel relative to its previous or initial time is conditioned on the at least one UE failure to access resources at a timeslot.

11. The system of claim 7, wherein the remaining channel access time is distributed same as the original unconditional distribution.

12. The system of claim 7, wherein the at least one UE selects the at least one RA parameter in the configuration information from a Sender Information Block (SIB).

13. A base station in a communication network comprising:
at least one processor for managing a contention based-random access (CB-RA) through a random access channel (RACH), the at least one processor configured to:
configure a set of RA preambles for CB-RA in a configuration information;
distribute the set of RA preambles between a defined first boundary and a second boundary using a continuous exponential distribution (ED) in the configuration information, wherein the base station distributes the RA preambles to occur continuously and independently with a constant parametric rate between the first boundary and the second boundary;
communicate the configuration information comprising the set of RA preambles through the RACH;
receive a selected at least one RA preamble from an at least one UE; and
provide a RA Response (RAR) responsive to the receiving the selected residual preamble from by the at least one User Equipment (UE).

14. The base station of claim 13, wherein the RA preambles is distributed constantly and independently with a constant average rate of $$\frac{1}{\bar{\lambda}},$$

for a $\bar{\lambda}$ as a constant rate parameter.

15. The base station of claim 13, wherein the continuous ED is a Poisson process-based distribution.

16. The base station of claim 13, wherein a time spent by the at least one UE waiting to access a channel relative to the at least one UE's previous or initial time is conditioned on the at least one UE failure to access resources at a timeslot.

17. The base station of claim 13, wherein remaining RACH access time is distributed same as the original unconditional distribution.

18. The base station of claim 13, wherein the at least one UE selects the at least one RA parameter in the configuration information from a Sender Information Block (SIB).

* * * * *